Oct. 21, 1941.  E. R. BURTNETT  2,259,729
AUTOMATIC CHANGE SPEED TRANSMISSION
Filed Dec. 6, 1937   3 Sheets-Sheet 2

INVENTOR.
Everett R. Burtnett

Oct. 21, 1941.  E. R. BURTNETT  2,259,729
AUTOMATIC CHANGE SPEED TRANSMISSION
Filed Dec. 6, 1937   3 Sheets-Sheet 3

INVENTOR.
Everett R. Burtnett

Patented Oct. 21, 1941

2,259,729

UNITED STATES PATENT OFFICE 2,259,729

AUTOMATIC CHANGE SPEED TRANSMISSION

Everett R. Burtnett, Los Angeles, Calif., assignor of one-third to Edith Glynn Burtnett, Los Angeles, Calif.

Application December 6, 1937, Serial No. 178,301

34 Claims. (Cl. 74—260)

This invention relates to power transmitting mechanisms and more particularly to mechanisms especially useful in change speed transmissions for motor vehicles intended for automatic drive establishment and automatic change speed accomplishments.

In general it is the principal purpose of my invention to provide a fully automatic selective speed transmission in which a slipping coupling participates in the drive in all speed ranges and has imposed upon it different torque values in different speed ranges, so that the coupling will have proper slip characteristics in providing the drive in each speed range. In the particular embodiment of my invention I have here shown and described, an automatic speed responsive clutch is normally no-drive when the vehicle is at rest. When the motor is accelerated, this clutch engages and assumes the entire engine torque and completes a drive through the transmission for providing a low gear ratio. The clutch is so proportioned and has such characteristics that it gives the proper amount of slip and softness in its action so that although it does not slip excessively, still it smooths out roughness and jerks that would accompany a solid connection. In order to provide a higher speed ratio of torque multiplication in the transmission, I provide a second clutch which automatically engages normally subsequently to the engagement of the first clutch. The engagement of this second clutch provides a second drive through the transmission in such a manner that the engine torque and power is divided between the two clutches and recombined in a differential gear unit before being delivered to the vehicle drive wheels.

It will be seen, therefore, that the clutch which originally had imposed upon it the full engine torque in low speed, has only a portion of the engine torque imposed upon it in second speed.

To establish a third speed ratio, I have provided an arrangement which reduces still further the torque and power required to be transmitted by the clutch which originally carried the full engine torque.

I have found that such an arrangement is far superior to other arrangements with which I am familiar, since my experience has indicated that when one slipping coupling in an automobile transmission has the same torque imposed upon it in different speed ratios, such a clutch will slip too much in the higher ratio or not enough in the lower ratio, unless the clutch is manually operated in such a manner that its slip resisting characteristics can be varied at will by the operator. The necessity for such manual operation is of course not desirable in an automatic transmission in which the principal object is to avoid the necessity for manual operation.

An important object of the present invention is to provide a novel transmission having a clutch adapted to come into operation for the purpose of establishing a faster speed lower rate torque-multiplying gear ratio to supplant a slower speed higher rate torque-multiplying gear ratio without interruption of the drive.

An additional object is to provide such a transmission wherein the clutch adapted for establishing the faster speed ratio is drivingly supplementive to and splits the torque with another clutch type coupling that previously carried all of the torque while maintaining the supplanted slower speed ratio.

Yet an additional object is to provide such a transmission with mechanism such that the accumulated clutching functions of the clutching unit that initially participated in the slow speed ratio and the clutching unit that subsequentially established the faster speed ratio are retained and together handle only an apportionment of the torque when a third clutching unit sequentially establishes a still faster speed ratio.

My invention, therefore, lies largely in the creation of a type of automatically variable change speed transmission which has particular utility in motor vehicle drives, and wherein a slipping coupling unit that comes into function to establish either of at least two speed ratios other than the lowest available is required to handle only an apportionment of the torque. This arrangement minimizes slip tendencies in the slipping coupling in certain of the speed ratios without giving too solid a connection in others of the ratios and also provides for a change of speed ratios upwardly to be transitionally effected if desired without interruption of the drive.

Another object of my invention lies in the creation of novel series two unit planetary gearing adapted to provide more than two speeds, and wherein after a first operating clutching means that drives a slow speed high rate torque-multiplying gear ratio is supplemented by a subsequently operable second clutching means that steps up the ratio to a faster speed lower rate torque-multiplying gear drive, one of the epicyclic gear trains in the series is established as a wholly revolving differential drive transmitting unit adapted to handle the torque coming through another epicyclic train in the series.

It is a further object to provide a novel transmission having the last above-mentioned features and in which the engagement of a third clutching means establishes a still faster speed ratio while simultaneously reducing the torque value required to be transmitted by the first clutching means and the second clutching means in such a manner that the two clutches interconnected by one of the epicyclic trains are required to handle only an apportionment of the torque required for propelling the load in either of the higher speed ratios.

It is a further object of my invention to provide a novel transmission for carrying out the above features with a differential gear unit in which the sun gear is driven in all speeds through a slipping coupling.

Still another object of the present invention is to provide a novel speed responsive clutch with means to insure its rapid engagement.

An additional object is to provide a novel automatic transmission with its operating elements so arranged that assembly and disassembly of the unit is facilitated.

Another object of the present invention is to provide an automatic motor vehicle change speed transmission that embodies a plurality of planetary gear trains in series for providing forward and reverse drive selectivity, and in which a shiftable jaw clutch means enables manual control to be exercised over the transmission, so that the transmission can be selectively locked in a forward positive drive in a given gear ratio, a forward drive in which automatic control is exercised over the speed ratios at which the planetary gear trains in series will operate, a reverse drive wherein one of the planetary gear trains of the gearset is differentially related to drive in reverse, or in a neutral position.

Other objects and advantages of the present invention will become apparent from the following description of a preferred embodiment of my invention taken in conjunction with the accompanying drawings in which similar characters of reference refer to similar elements throughout the several views.

Figure 1:
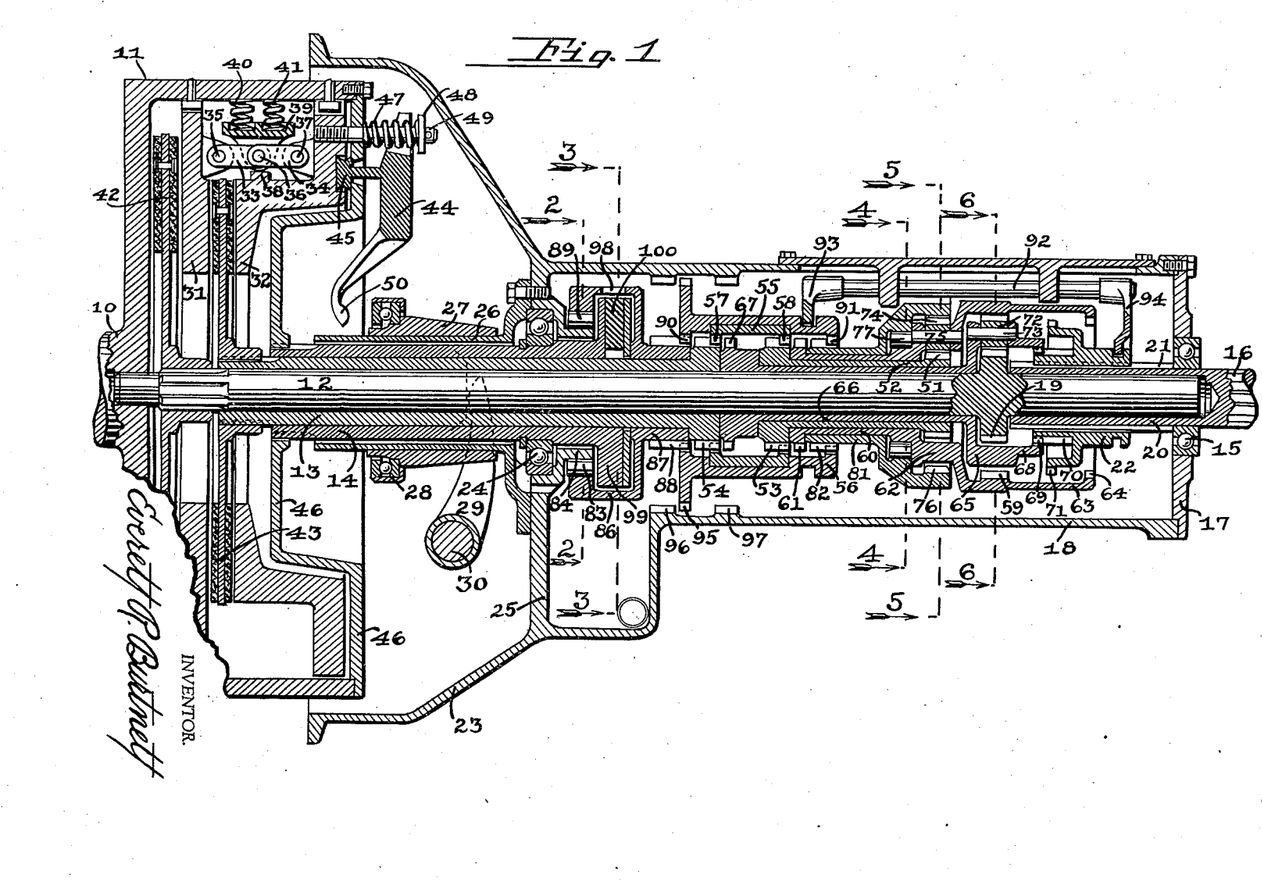
Fig. 1 is a longitudinal vertical central sectional view taken through a change speed transmission constructed in accordance with my present invention.

Referring to the drawings, 10 designates the engine driven transmission driving member or engine crankshaft, while 11 indicates a flywheel portion rotatable therewith. The numerals 12, 13, and 14, respectively, indicate a central low speed ratio clutch shaft, an intermediate second speed ratio driving concentric clutch shaft, and an outer high speed ratio driving concentric shaft.

Preferably, the central clutch shaft 12 extends rearwardly the full length of the change speed transmission gearing and is journaled at its rearward end in the forward end of a vehicle propelling driven tail shaft 16. This tail shaft is in turn journaled in a bearing member 15 secured, preferably, to a detachable rear wall 17 of the gear box housing 18.

A low or first speed ratio driving pinion 19, preferably integral with the shaft 12, is provided to rotate with the central shaft 12 near its rearward end. The portion of the driven shaft 16 that surrounds the shaft 12 will, for convenience, be referred to as a sleeve portion 20. The external surface of this sleeve portion 20 is provided with splines 21 fitted to complementary splines on a longitudinally shiftable jaw clutch 22. These splines, therefore, permit longitudinal movement of the jaw clutch 22, while insuring drive relation between this clutch and the driven shaft 16.

At its forward end, the transmission case 18 is provided with a bell-like portion 23, while at approximately the juncture of the bell 23 and the case 18, a front wall partition 25 extends across the case. This wall carries a shaft bearing 24 which journals the outer shaft 14 and is secured in place by a cap 26. The cap in turn has a forwardly extending sleeve portion 26 which acts as a guide for a clutch carriage 27. At its forward end, the carriage 27 has a clutch throwout bearing 28, while a bifurcated arm 29 pivoted by a transverse shaft 30 acts in the usual manner to move the carriage forwardly when a pedal is depressed by the driver's left foot.

A pair of presser clutch plates, or driving clutch engaging members 31 and 32 are both secured by splines to the flywheel portion 11, so that they rotate with this portion but are permitted to have longitudinal movement relative thereto. A mechanism adapted normally to spread apart these two presser clutch members 31 and 32 is provided in the form of toggle linkage comprising links 33 and 34 pinned together at 36 and to the plates at 35 and 37. During rotation of the flywheel, the midpoint of the linkage at the pin 36 tends to move outwardly from an inward limiting base abutment stop 38, under centrifugal force—concentrated at the pin 36. A centrifugal weight 39 is pivoted to the central pin at 36 and adds to this centrifugal effect. A pair of coil springs bearing with their opposite ends against the rim of the flywheel 11 and the weight 39 tend to urge the weight 39 and the pivot pin at 36 inwardly against the stop 38. In this latter position, the pin 36 is in dead center relation with respect to the pivot points 35 and 37.

These links, therefore, when in this position, resist any longitudinal thrust pressure tending to move one plate toward the other. At low speeds, the springs 40 and 41 over-rule any endwise or centrifugal force tending to bring about collapse of the linkage. However, upon a sufficient speed of rotation being attained by the flywheel 11, the force of the centrifugal weight 39 over-rules the force of the springs 40 and 41, and thus the center pin 36 is moved outwardly, whereby the normal dead center toggle effect of the links 33 and 34 is directly centrifugally collapsed so as to permit the longitudinal distance between the two presser clutch plates 31 and 32 to be lessened by any force tending to produce such movement.

At slow speeds the two presser clutch plates 31 and 32 and their connecting links 33 and 34 form a longitudinally movable body through which may be transmitted a thrust pressure in an axial or longitudinal direction. In other words, by this novel combination and arrangement, the two presser plates 31 and 32 which later are adapted to form distinct clutching units when one is moved toward the other, at first form a single presser-member able to bring about a single clutching function. In order to obtain this clutching effect, I provide a first driven clutch disk 42, located between the presser plate 31 and the flywheel 11 and adapted to be clutched to the flywheel when the clutch member 31 is moved to the left either alone or along with the clutch member 32. The first disk 42 is carried to rotate with the central or low speed ratio driving clutch shaft 12 and completes the first to be engaged low speed ratio clutching unit. Further, I provide a second driven clutch disk 43 carried by and adapted to rotate with the second speed ratio driving clutch shaft 13. This second clutch disk is disposed between the two presser clutch plates 31 and 32, so that forcing of the two presser clutch plates 31 and 32 together will cause these plates to grip the second speed disk 43, thus causing the disk 43 to revolve with the common driving wheel 11.

As a common automatic energizing means adapted to cause the engagement of both clutches, I provide a master system of centrifugal weights 44 preferably of a form having feet portions 45 wedged between the cover or fixed back plate 46 of the wheel 11 and the presser plate 32. It is the function of these master centrifugal weights 44 ultimately to energize the engagement of both clutch disks 42 and 43, but by virtue of the dead center toggle linkage 33 and 34, both plates 32 and 31 are at first moved to the left together so as to clutch the low speed disk 42 between the flywheel face and plate 31. Thereafter, upon the collapse of the dead center toggle, brought about by the auxiliary centrifugal weights 39, the second disk 43 is gripped between plates 31 and 32.

To prevent engagement of either of the clutch disks 42 and 43 until the driving member has attained a predetermined speed of rotation, I provide a system of master retractive springs 47 acting through the medium of a washer 48 and bolt 49 normally to retract the rearward presser plate 32 into an unengaged state, and in turn, through the medium of the links 33 and 34, to retract the forward presser plate 31 into an unengaged state.

When, with the vehicle at rest, the motor is accelerated, the master centrifugal weights 44 initially operate to engage the low speed driving clutch disk 42. This engagement is accompanied by considerable slip, since it begins before the centrifugal force acting upon the weights 44 is very great. As the motor speed increases, the centrifugal force becomes greater and therefore the slip becomes less. At a predetermined higher engine speed, the toggle linkage collapses, as previously described, and the second speed clutch disk 43 is quickly engaged with very little slip since the centrifugal force then acting upon the weights 44 is relatively high. The engagement of the second speed clutch will of course slow the rotation speed of the flywheel 11, but this will not cause excessive slipping in the first clutch, since, as will be pointed out more fully later, the first clutch transmits only a portion of the torque when the second clutch is accumulatively engaged.

The inner portions of the weights 44 are extended inwardly to form fingers 50 which are urged toward the left by the throwout bearing 28 when this bearing is moved to the left by means of the previously mentioned left foot actuated pedal. Thus, by depressing this pedal about half way, the weights 44 cannot move outwardly to engage the clutches. By pushing the pedal farther, the weights are rocked in the opposite direction and the lower ends of the feet 45 urge the plate 32 to the left, thus providing manual means for engaging the low speed clutch. This enables the driver to effect a manual clutch engagement to start a dead engine from vehicle motion through the medium of the transmission.

A second pinion gear 51 is arranged coaxial with the first mentioned pinion gear 19. These two pinion gears 19 and 51 form sun drive gears of distinct planetary gear trains that can be operated in series to give a certain speed ratio of gear drive. Also, one of these trains (preferably the train which includes the sun gear 19) may be operated alone to give a different speed ratio of gear drive. A sleeve shaft 52 attached to or formed as a portion of the second sun gear 51 extends forwardly and at its forward end is provided with an enlarged section formed as one member 53 of a positive jaw type clutch. A similar jaw clutch element 54 is formed at the rearward end of the second clutch shaft 13 and is spaced somewhat ahead of the clutch element 53. A shiftable clutch member 55, having complementary internal clutch jaws 57 and 58 at opposite ends thereof, normally is positioned with jaws 57 engaged with jaws 54 and with jaws 58 engaging jaws 53. The clutch member 55 therefore couples the second speed clutch shaft 13 to the sun gear 51. This clutch member 55 is formed as a sleeve carried shiftable with, but rotatable relative to, and inside of another jaw clutch member 56, so that the two clutch members can be shifted together.

From the above description it will be seen that when the engine is accelerated from idling, clutch disk 42 will be grasped and thereafter disk 42, shaft 12 and sun pinion 19 will revolve with the flywheel. At a higher engine speed, the toggle linkage will collapse and thereafter clutch disk 43, shaft 13, clutch 55, sleeve 52 and sun pinion 51 also will revolve with the flywheel.

An internal gear 59 surrounds the sun 19 and rotates with an annular planet carrier 62 that surrounds the other sun gear 51. This planet carrier is in turn connected to a forwardly extending sleeve shaft 60 provided at its forward end with external jaw clutch elements 61. A rearwardly extending tubular portion 63 formed with the internal gear 59 is provided with internal jaw clutch elements 64 at its rearward end.

A rearward annular planet carrier 65 is positioned between the sun and internal gears 19 and 59 and has a forwardly extending sleeve-shaft portion 66 also terminating at its forward end in a jaw clutch element 67. A rearward tubular extension 68 of this planet carrier is provided with internal jaw clutch elements 69.

The longitudinally shiftable jaw clutch member 22 splined to the tail shaft 16 has comparatively long jaw clutch elements 70 normally engaged with the clutch elements 69. The clutch jaws 70 are made comparatively long, so that they will maintain engagement with the complementary jaws 69 throughout a considerable range of longitudinal movement of the clutch member 22. Other jaw clutch elements 71 formed upon the member 22 are adapted upon rearward movement of the member 22 to engage the jaws 64 shortly after jaws 69 and 70 have become disengaged. This clutch 22, as will be described more fully subsequently, provides for the shift from forward speeds to reverse or to neutral.

Figure 5:
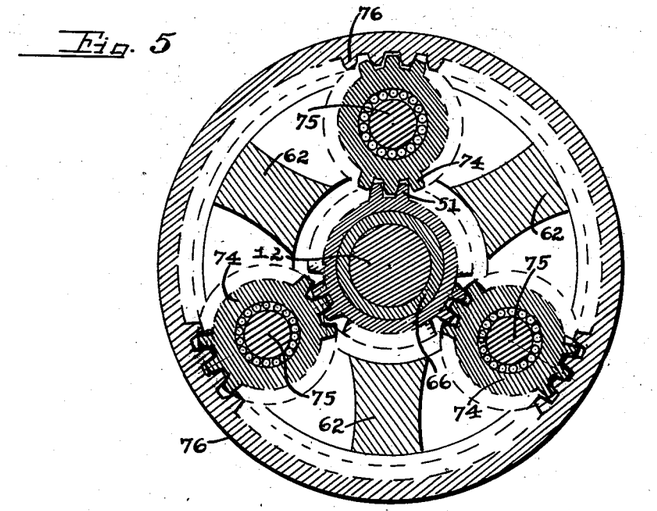
Fig. 5 is a transverse sectional view taken on line 5—5 of Fig. 1, viewed from the direction indicated by the arrows on Fig. 1, and illustrating one of the planetary gear trains present in the transmission.
Figure 6:
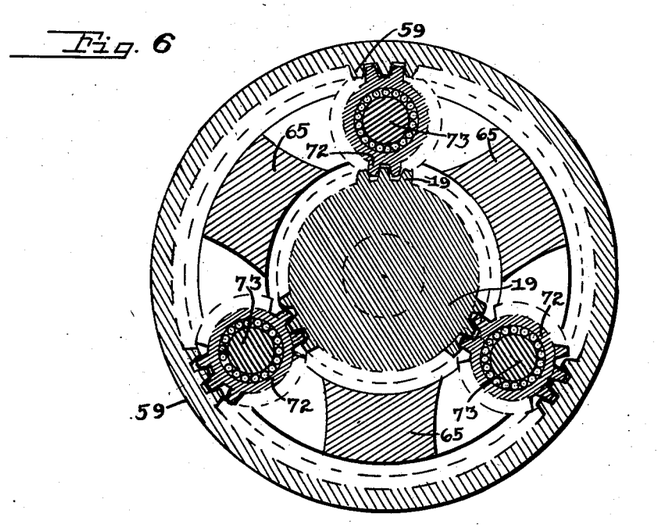
Fig. 6 is a transverse sectional view taken on line 6—6 of Fig. 1, viewed from the direction indicated by the arrows on Fig. 1, and illustrating another planetary gear train included in the device.

A plurality of planet gears 72 are journaled upon pins 73 which in turn are secured to the planet carrier 65. These planets mesh with the sun 19 and the internal gear 59. Another set of planet gears 74 are journaled upon pins 75 secured to the planet carrier 62 and are meshed with the sun 51 and a second internal gear 76 that surrounds the sun 51.

The low speed ratio in the transmission is provided by driving the sun pinion 19 in the manner previously described while the planet carrier 65 is connected to the tail shaft 16 by clutch 22, and while the internal gear 59 is brake held so as to establish reactance. The means for establishing this reactance in the automatic speeds consists of a one-way overrunning brake 77 located between the planet carrier 62 and the forward extension of the internal gear 76. This one-way brake prevents retrograde rotation of the planet carrier 62 and the internal gear 59 attached thereto so long as the internal gear 76 is maintained against retrograde rotation. The mechanism for preventing retrograde rotation of the internal gear 76 will be described presently.

Figure 2:
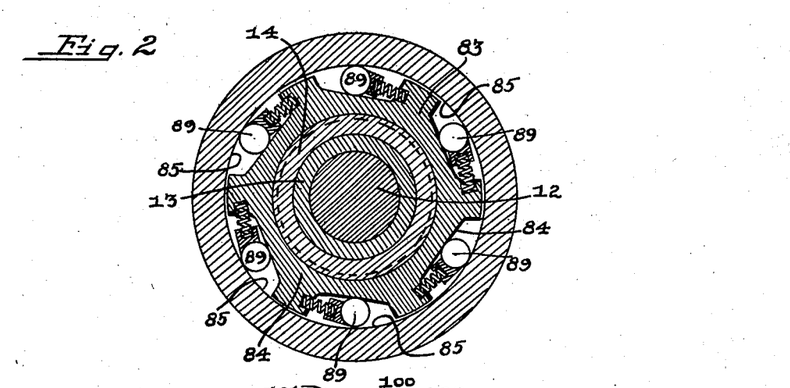
Fig. 2 is a vertical transverse sectional view taken on line 2—2 of Fig. 1, viewed from the direction indicated by the arrows on Fig. 1, and illustrating the secondary overrunning brake for finally preventing backwards rotation of either one or both of the distinct planetary gear trains employed in this device.

The overrunning brake 77 may be of any well-known type. The type shown consists of cams 78 rotatable with the internal gear 59, an annulus 79 rotatable with the internal gear 76 and roller brake members 80 positioned between the cams and the annulus. Thus attempted retrograde motion of the cams 78 relative to the annulus will wedge the rollers against the annulus and lock the unit, while relative rotation in the opposite direction will free the rollers and thus free the annulus and cams for rotation in this direction.

Figure 4:
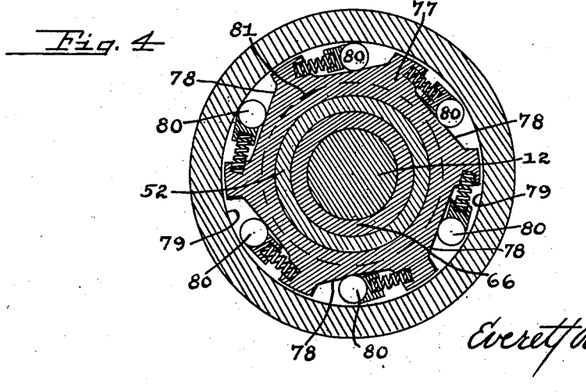
Fig. 4 is a vertical transverse sectional view taken on line 4—4 of Fig. 1, viewed from the direction indicated by the arrows on Fig. 1, and illustrating another overrunning brake unit included in the present embodiment of my invention.

To prevent the internal gear 76 from rotating backwardly, this gear is formed with a forwardly extending sleeve-portion 81 terminating at its forward end in a jaw clutch element 82. An overrunning one-way brake 83 is comprised of a cam-shaped hub 84 fixed to the front wall 25 of the transmission case, an annulus 85 and rollers 89 positioned between the cams and the annulus. The annulus 85 is formed at the forward end of a bell 86 connected to a rearwardly extending hub 87 provided with external jaw clutch elements 88. The clutch member 56 is provided with internal clutch jaws 90 at its forward end and these jaws 90 engage jaws 88 in all forward transmission speeds. The one-way brake 89 thus provides reactance for the internal gear 76 and the internal gear 59, the latter being prevented from rotating reversely relatively to internal gear 76 by one-way brake 77. The arrangement, however, permits both internal gears to rotate forwardly together and also permits internal gear 59 to rotate forwardly while internal gear 76 is stationary.

The two jaw clutch members 56 and 22 are connected to be shifted longitudinally as a unit by a shift rail 92 and bifurcated shifters 93 and 94 secured thereto and coacting respectively with annular slots in clutches 56 and 22. Any suitable and well-known means may be provided to enable the driver to shift the rail 92 longitudinally.

An alternative positive second gear drive, desirable for descending hills for instance, can be established by shifting the rail 92 and clutches connected thereto one step forwardly from the position shown. This forward movement of the clutches does not disturb the connections made between the revolvable members, since the jaws 88, 54, 53, 82 and 70 all extend to the left sufficiently to provide this continued engagement. It does however cause an external jaw clutch portion 95 formed upon the forward portion of the clutch member 56 to be brought into engagement with complementary jaws 96 formed as a portion of, or at least secured to, the case 18. When the jaws are thus engaged, the internal gear 76 is locked against movement. Forward movement of the rail 92 an additional step does not disturb the engagement between jaws 95 and 96 or 69 and 70. It does, however, move jaw 91 from jaw 82 to 61 and it disengages jaw 58 from jaw 53. This movement therefore locks internal gear 59 against rotation and provides a positive low gear to be used whenever desired.

When the rail 92 is shifted one step to the right of the position shown, jaw 69 will become disengaged from jaw 70 and the transmission will be in neutral since no revolvable member is connected to the tail shaft. This shift also separates jaws 57 and 54 so as to render clutch shaft 13 no drive, and connects jaws 57 and 58 respectively with jaws 67 and 61. This locks the rearward planetary train to revolve as a unit and renders clutch shaft 12 no-drive.

Movement of the rail 92 another step rearwardly connects jaw 71 with jaw 64. It also causes jaw 95 to engage a jaw 97 secured to the case 18 in a manner similar to jaws 96 so as to lock clutch member 56 against rotation. Also jaw 90 engages jaw 67, thus locking planet carrier 65, jaw 91 is free of any engagement, jaw 57 is free of engagement, and jaw 58 engages jaw 82.

Since the rearward planet carrier 65 is locked, and internal gear 59 is connected to the tail shaft 16, the sun 19 drives through the planets 72 as reactance members and causes reverse rotation of the internal gear 59 and tail shaft 16. It should be noted that when the transmission is shifted into reverse, clutch shaft 13 idles, and therefore motor speeds sufficient to cause engagement of clutch 43 will not effect the reverse drive.

With the transmission shifted into the position shown, jaw 95 is free of either jaws 96 or 97, clutch member 56 therefore can revolve in one direction. It is locked against revolving in the other direction by the one way brake 89 which is connected to clutch 56 by the engagement between jaws 88 and 90. Also as previously described, jaws 91 and 82 are in engagement, jaws 57 and 54 are engaged, jaws 58 and 53 are engaged and jaw 69 engages jaw 70. This position of shift is the one that provides for automatic operation. Thus in low speed, internal gear 59 is stationary, planet carrier 65 is connected to the tail shaft and all of the drive comes through clutch disc 42 and sun gear 19. In second gear, both clutch discs 42 and 43 are driven and respectively drive sun gears 19 and 51 at engine speed. Since internal gear 76 is stationary, planet carrier 65 will revolve at reduced speed and will overrun internal gear 76. The final drive to planet carrier 65 and thence to the tail shaft is therefore the differential between the internal gear 59 and sun gear 19. In second speed therefore, both slip clutches participate in the drive and neither is required to assume the whole torque or power. It appears further that the ratio of the torque assumed by these clutches is the same as the ratio of the pitch line velocities of the gears 19 and 59 driven through these clutches.

From the foregoing it will be seen that in second speed, sun gears 19 and 51 are both driven at engine speed, while internal gear 76 remains stationary. In order to provide a direct drive high speed, I provide an arrangement for continuing the second speed driving connections and add thereto a connection for driving internal gear 76 at engine speed. Thus internal gear 76 and sun gear 51 revolve at engine speed and drive planet carrier 62 at engine speed. Planet carrier 62 drives internal gear 59 at engine speed, and since sun gear 19 is revolving at engine speed, planet carrier 65 and in turn tail shaft 16 will also be driven at engine speed.

The high speed connection for driving internal gear 76 at engine speed comprises a speed responsive clutch for connecting the flywheel 11 to the clutch member 56. This high speed connection is made directly to the flywheel. It therefore assumes a portion of the torque and power of the motor and consequently reduces the torque and power required to be transmitted through clutch discs 42 and 43. The high speed connection is preferably made through a speed responsive clutch which may be of either the slipping or positive type.

Figure 3:
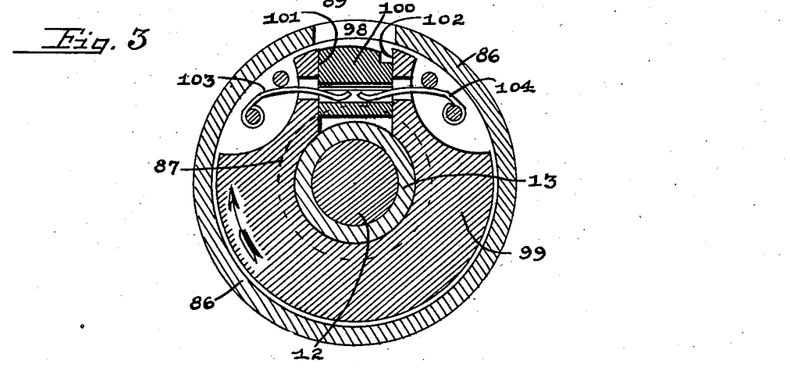
Fig. 3 is a vertical transverse sectional view taken on line 3—3 of Fig. 1, viewed from the direction indicated by the arrows on Fig. 1, and illustrating a suitable form of positive type centrifugal clutch unit comprising one of the several distinct drive connecting centrifugal automatic clutch units embodied in this embodiment of my present invention.

One form this clutch may take is illustrated in the drawings and comprises a plurality of openings 98 formed in the portion of the bell 86 generally parallel to the axis of rotation. Inside this bell 86 is positioned an annular member 99 formed integrally with or directly connected to the shaft 14 which is in turn directly driven from the flywheel 11 at all times. The annular member 99 therefore always revolves at engine speed and may revolve relative to the bell like portion 86. One or more weighted clutching members 100 are mounted in guides 101 and 102 in the annular member 99 and are adapted for radial inward and outward movement in these guides. When in their inward position, they permit the member 99 to revolve relative to the bell 86. In their outward position, these clutching members 100 extend through the openings 98 and prevent relative motion between the annular member 99 and the bell 86. Under these conditions, therefore, the flywheel 11 drives the internal gear 76 at engine speed. These clutching members 100 are normally retracted by means of springs 103 and 104 and therefore cannot move outwardly and engage in openings 98 until a predetermined engine speed has been attained. However, even though the transmission is in second speed and the engine speed is above the speed necessary to cause outward movement of the clutching members 100, these members are prevented from moving outwardly so long as there is relative rotational movement between these members and the bell 86. In order to shift into high speed therefore, it is necessary momentarily to decrease the motor speed until the load acting through the tail shaft 16 causes the bell 86 to come up to engine speed, at which point engagement of the clutching members 100 in the openings 98 will take place. This arrangement therefore provides a simple mechanism for enabling the driver to delay the shift from second to direct drive as long as desirable. Such a feature is desirable since it enables the driver to obtain better acceleration at intermediate speeds than would be possible in high gear alone.

One of the advantageous constructional features embodied in the transmission shown consists in an arrangement of elements that permits ready assembly and disassembly of the unit.

For instance, the flywheel casing is formed in two parts which are bolted together at their peripheries. Thus, the large diameter clutching elements can be slid endwise into the flywheel case 11 before the cover 46 is attached. Also all of the shafts that either extend into or connect with the flywheel are connected by splines and therefore can easily be withdrawn in an endwise direction. Since the splines at the forward ends of these shafts are no larger than other portions of the shafts near their forward ends, it is also possible to remove these shafts rearwardly through the bearing 24.

Among the functions, both automatic and manual, adapted to be performed by the transmission shown and described are the following:

Neutral operation

By moving the shift rail 92 one step rearwardly from the position shown, jaw clutches 69 and 70 separate. The transmission, therefore, cannot drive the tail shaft 16. Also, the motor can be raced or permitted to idle since jaw 88, associated with driven shaft 14, is separated from jaw 90, while jaw 54, associated with driven shaft 13, is connected with jaw 90 upon the clutch member 56. The other jaw 91 of this clutch member is unconnected with any driven member and, thus, driven shaft 13, like driven shaft 14, is free to rotate. Also, neither jaw 53 associated with sun gear 51, nor jaw 82 associated with internal gear 76 are engaged with any other clutch jaws, the driven shaft 12 leading to the sun gear 19 is free to rotate therefore, since there is no reactance member to oppose this rotation.

Positive low gear

This positive speed may be obtained by moving the shift rail 92 two steps forwardly from the position shown. Under these conditions, sun pinion 19 driven by shaft 12 will drive the planet carrier 65, since internal gear 59 is locked to the transmission case by the connection between jaws 61 and 91 and the connection between jaws 95 and 96. The planet carrier 65 is, in turn, connected to the tail shaft by the mutual engagement of jaws 69 and 70. The planet carrier 65 is free to rotate with the tail shaft inasmuch as jaw 67, associated with this planet carrier, is not engaged by any of the other jaws in either clutch 56 or 55. Movement of the shift rail 92 into this positive low position also disassociates jaws 57 and 54, so that motor speeds sufficient to drive the driven shaft 13 will have no influence upon low speed operation.

Positive second gear

This is accomplished by moving the shift rail 92 one step forwardly from the position shown. With the clutches as thus shifted, sun gear 19 is driven at engine speed by means of shaft 12, while shaft 13 similarly driven at engine speeds is connected by jaws 54 and 57 to clutch member 55, which, in turn, by means of jaws 58 and 53, is connected to sun gear 51. Internal gear 76 is locked to the transmission case through engaged jaws 82 and 91 which connect this internal gear to the clutch member 56. This clutch member is in turn locked by engaged jaws 95 and 96 to the transmission case. The drive to planet carrier 65, which is connected to the tail shaft by engaged jaws 69 and 70, is, therefore, through differential operation of the sun gear 19, driven at engine speed and the internal gear 59 driven somewhat slower than engine speeds. Internal gear 59 in turn has a speed which is the differential between sun gear 51, which is driven at engine speed, and the stationary internal gear 76.

Because clutch member 56 is positively locked to the transmission case and therefore cannot rotate in either direction in positive low speed and positive second speed, the drive in both of these speeds is reversible, that is, the vehicle will not free wheel. In either of these speeds, however, it is possible to coast by depressing the clutch pedal which forces clutch throwout bearing 28 against weight arms 50, thus causing disestablishment of the drive between flywheel 11 and clutch driven disc 42.

Reverse gear

When the shift rail 92 is moved two steps rearwardly from the position shown, jaws 69 and 70 will be disengaged and jaw 71 will engage jaw 64. The tail shaft 16 is therefore connected to the internal gear 59, while the sun gear 19 is connected by means of shaft 12 and clutch disc 42 to the flywheel 11. Planet carrier 65 is connected by means of jaws 67 and 90 to clutch member 56, which in turn is locked to the transmission case by means of the engagement between jaws 95 and 97. The planet carrier 65 therefore becomes a stationary reactance member and the reverse drive is brought about by gear function in the rearward epicyclic train only. Jaws 87 and 54 are unconnected with any other jaws and, therefore, motor speeds sufficient to cause rotation of either shaft 13 or the hub 87 will not affect the reverse drive. Also, jaw 82, connected to the internal gear 76, is not clutched to any other member excepting the freely revolvable clutch member 55 while sun gear 51 is freely revolvable, since the clutch jaw 53 associated therewith is not connected to any other clutch jaw.

In reverse, as in the other positive gears, the clutch pedal may be used to release the drive to the clutch driven disc 42 so as to render the transmission no-drive.

Automatic forward drives

The shift rail 92 is shown in the drawings in the proper position to condition the transmission for automatic operation. When in this position, jaws 69 and 70 are engaged, thus connecting the planet carrier 65 of the rear gear unit directly to the tail shaft 16. This planet carrier can rotate with the tail shaft because clutch jaw 67, also associated with this planet carrier, is not engaged by any other clutch jaw. Clutch jaw 61, associated with planet carrier 62 and internal gear 59 which are connected together, is not engaged by any other clutch jaw in the transmission. Internal gear 76, however, is connected by means of clutch jaws 82 and 91 to clutch member 56 which, in turn, is connected by jaws 90 and 88 to hub 87. Sun gear 51 is connected by means of jaws 53 and 58 to clutch member 55 which at its opposite end is connected by means of jaws 57 and 54 to clutch shaft 13.

With the motor idling, both clutch discs 42 and 43 are free of engagement with the flywheel 11, while shaft 14 directly connected to the flywheel exerts no driving influence, inasmuch as the centrifugal clutch comprised of the members 100 and 86 will not engage at idling speeds.

When the accelerator pedal is depressed, the engine speed will increase, thus speeding the rotation of the flywheel 11 and causing the weights 44 to fly outwardly. These weights urge clutch plate 32 forwardly and through the toggle mechanism, comprised of the links 33 and 34, causes clutch plate 31 to gradually press driven disc 42 into driving engagement with the flywheel 11. Sun shaft 12, therefore, gradually approaches engine speed. The planet carrier 65 and tail shaft 16 therefore are driven at a speed which is a differential between sun gear 19 and internal gear 59. In this low speed ratio, internal gear 59 acts as a reactance member and is held stationary by the one-way brake 77 acting between this member and internal gear 76. Internal gear 76 in turn is held against retrograde rotation by clutch member 56 and one-way brake 89. This automatic low speed, therefore, is a free wheeling speed and it will be appreciated that all the power and torque exerted upon the transmission to drive the load must come through clutch disc 42. Clutch disc 42, therefore, will slip relative to flywheel 11, at least during the initial stages of engagement of this first operating clutch. Also, since all of the torque must come through this one clutch, the vehicle will have less tendency to creep with the motor idling, since any slight drag between flywheel 11 and clutch disc 42 will be insufficient to move the load.

Automatic second speed

As the motor speed, and with it the car speed, increases to a predetermined point, centrifugal force acting upon weight 39 will overcome the oppositely acting force provided by springs 40 and 41 and will buckle the toggle mechanism previously referred to. This permits weights 44 to urge the clutch plate 32 forwardly, thus engaging clutch disc 43. It is preferable that at the time the toggle linkage is caused to buckle, the force exerted by the weights 44 will be sufficient to pack this second speed clutch sufficiently rapidly, so that prolonged slip will not take place. Shaft 13, connected to clutch plate 43, through the connections previously mentioned, drives sun gear 51 at engine speed. This causes internal gear 59 to be driven at a speed which is a differential between that of the sun pinion 51 and the stationary reactance internal gear 76. In thus revolving, the internal gear 59 overruns internal gear 76 at the one-way brake 77. The drive to the planet carrier 65 and, thus, to the tail shaft 16 is therefore through sun gear 19 and internal gear 59.

In this second speed, it will be appreciated that the torque and power required to drive the tail shaft 16 is divided, a portion of this power and torque coming through clutch disc 42 to the sun gear 19 and another portion of the power and torque coming through clutch disc 43 to sun gear 51 and thence to internal gear 59. It will also be seen that the vehicle will free wheel in this automatic second speed and that the shift from low to second will be accomplished without interruption of torque.

Direct drive

As the motor speed increases still further, clutch members 100 will tend to fly outwardly. They will, however, be prevented from entering openings 98 in the bell 86 because of the relative rotation between these members. By releasing the accelerator pedal momentarily, the rotation speed of sun gears 51 and 19 will decrease as the engine speed decreases, while the load will drive the shaft 16 at a speed which may decrease also, but which will not decrease as rapidly as the engine speed decreases. The bell 86, therefore, will overrun at the one-way brake 89 until this bell portion 86 and the clutch members 100 are in approximate synchronization. The clutch members 100 will then move outwardly into the openings 98, thus bringing about a positive connection between the flywheel 11 and internal gear 76. Under these conditions, sun gear 51 and internal gear 76 will revolve at engine speed, thus driving planet carrier 62 and internal gear 59 at engine speed. Then, since internal gear 59 and sun gear 19 are both revolving at engine speed, planet carrier 65 and tail shaft 16 will also revolve at engine speed. The drive through the transmission is, therefore, direct excepting that some slight slipping may take place in the friction clutches at the forward end of the transmission under momentary overloaded conditions. It will be appreciated that this direct drive is a positive drive in the sense that it is not a free-wheeling drive and that the engine torque and power is divided between clutch discs 42 and 43 and clutch members 100, and that therefore clutch discs 42 and 43 assume a less proportion of the engine torque and power than they assume in second speed.

In any of these automatic speeds, the drive can be disconnected from the engine by depressing the clutch pedal in the manner previously mentioned. Also, this clutch pedal can be used to shift the transmission from high gear into second gear. This is accomplished by depressing the clutch pedal momentarily, while simultaneously releasing the accelerator pedal. When this occurs the reduced engine speed will reduce the speed of rotation of the clutch elements 100, so that their springs tend to draw them inwardly. Also, since there is no drive between the flywheel 11 and the clutch plate 42, there will be no load upon the clutch members 100 and these clutch members will, therefore, be retracted as soon as the motor speed has been reduced sufficiently. After this has occurred, the clutch pedal may be released and the accelerator depressed. This act will cause the transmission to drive in second gear in the manner previously mentioned. Should it happen that the road speed is below the second speed range when the accelerator pedal is again depressed, the motor speed will not increase sufficiently to cause packing of the second speed clutch disc 43. The transmission will therefore automatically revert into low speed.

Thus it will be seen that I have provided an automatic change speed transmission particularly suited for use in motor vehicles which lends itself to driver control for obtaining different permanent positive gears, either for negotiating long gradients with heavy loads, or for obtaining the most satisfactory positive gear ratio for utilizing the engine compression as a brake under any given conditions; for affording a three forward speed getaway with automatic change between first and second and between second and high with automatic pick-up of the load from a standing start in response to acceleration of the engine above idling; for affording automatic declutching when the vehicle is slowed below a certain speed; and for automatically meeting all other requirements that conventional shift transmissions meet when manually controlled. I have also provided a change speed transmission and co-ordinated multi-clutch mechanism that is comparatively inexpensive to manufacture and which, due to novel divisions of load, torque, power applications, and stress, is by design inherently rugged and reliable and capable of rendering continuous heavy duty service, in either passenger or commercial adaptations.

It will be understood that the general features of the invention may be embodied in variously differing constructions of transmissions, such as compounded planetary gear units of forms at variance with those shown, or partial planetary gearing and other forms of speed and torque changing gearing making up the whole gearing assembly, or substitute forms of clutching and braking devices at variance with those shown and at variance with respect to relationship and as regards the number of speeds involved in the range, and that various other changes may be made in the components of the transmission and otherwise without departing from the spirit of the invention, as set forth in the appended claims. It will be seen that substitution of fluid couplings in the place of one or more of the shown clutching units would leave the transmission under speed responsively controlled drive establishability, or change speed control substantially as obtained with the clutching means shown.

Having described my invention, what I claim as new and useful and desire to secure by Letters Patent of the United States is:

1. In a power transmitting mechanism, the combination of a driven member, two planetary gear trains adapted to be arranged gear functional in series under certain conditions, each of said trains comprising an individual sun drive gear and an individual internal gear and an individual system of planet gears in constant mesh with, and connecting the sun and internal gears of the respective trains, and an individual planet carrier member, means for connecting and disconnecting at least one driven element of one of the planetary gear trains to drive said driven member, means including a stationary member and an overrunning device for forming a one-way stop brake mechanism for preventing the internal gear of the other of the planetary gear trains from rotating backward, and means including a second overrunning device reacting against said stationary member through the medium of said brake device and forming a one-way clutch mechanism for preventing the internal gear of said one planetary gear train from rotating backward.

2. In a power transmitting mechanism, the combination of a driven member, a plurality of planetary gear units in series, a stationary member, each of a plurality of said planetary gear units having a sun gear element, an internal gear element and a planet carrier element and at least two of said elements in each of the last said plurality being adapted to be selectively established in restraint against said stationary member to prevent the respective elements from rotating in at least one direction, and means including engageable and disengageable elements adapted for selectively establishing either one or another of the elements of one of the gear units or one or another of the elements of another of the gear units in connection with said stationary member to restrain the respective elements against rotation in at least one direction.

3. In a power transmitting mechanism, the combination of a plurality of planetary gear units so related that their combined elements gear function in series to give a certain gear ratio of drive under certain conditions, each of said gear units having an internal gear, a planet gear and a carrier element therefor, and a sun gear element, a stationary member, means for selectively establishing either the internal gear or one of said elements of one of the planetary gear units or the internal gear or one of said elements of another of the planetary gear units in connection with said stationary member to prevent the respective internal gear or element so established from rotating in either direction.

4. In a power transmitting mechanism, the combination of a driven member, a plurality of planetary gear trains adapted to be arranged in series for driving said driven member, independent driving elements for each of said planetary gear trains, each of said driving elements having a shaft-shaped portion extending forwardly, said shaft portions being all in concentric relation, a driving member, a plurality of concentric intermediate shafts each adapted to be individually driven from said driving member, clutch jaws on a plurality of said intermediate shafts, clutch jaws on a corresponding plurality of said forwardly extending shaft portions, jaw clutch mechanism adapted to be shiftable for individually connecting or disconnecting a plurality of said intermediate shafts to said forwardly extending shaft portions, and multi-clutch mechanism for individually coupling a plurality of said intermediate shafts to said driving member.

5. In a power transmitting mechanism, a multi-speed system of planetary gearing comprising two planetary gear trains, each of said trains having a sun drive gear, an internal gear, a planet gear and a planet gear carrier, means for applying the load to the planet carrier of one of said trains, means for applying the rotative efforts of the other planetary gear train to the internal gear of said one train, means including an overrunning clutch mechanism so arranged that any tendency of the internal gear of said one train to rotate backwardly under the influence of forward rotative efforts being applied solely to the sun gear of the same gear train will be resisted by the internal gear of the other planetary gear train, reaction brake means adapted to act on the internal gear of said other planetary gear train to in turn resist said backwardly rotating tendency to prevent reverse rotation of the internal gears of either of the two planetary gear trains, said overrunning clutch forming means to permit the internal gear of said one planetary gear train to be driven forwardly by the gear function of said other planetary gear train under the influence of forward rotative efforts being applied to the sun gear of said other planetary gear train, and means for driving either solely the sun gear of said one planetary train or simultaneously the sun gears of both planetary gear trains.

6. In a power transmitting mechanism, the combination of a plurality of planetary gear units arranged in series and adapted for combined gear function under certain conditions to give a given gear ratio, individual reactance members for each of at least two of the plurality of planetary gear units, one of said two gear units adapted to output its gear function to the reactance member of the other of said two planetary gear units, means for driving either one or both of said two planetary gear units through another element of the respective gear units, a stationary member, one way stop brake mechanism for serving either to hold the reactance member of one of said two planetary gear units or to hold the reactance member of the other of said two planetary gear units, and means including a shiftable member adapted when in one position to establish the reactance member of one of said planetary gear units in positive restraint against rotation in either direction and when in another position to establish the reactance member of the other of said planetary gear units in positive restraint against rotation in either direction.

7. In a transmission, an input shaft, an output shaft, a planetary gear group, means connecting one of the elements of said gear group to said output shaft, a pair of slipping couplings comprised of driving and driven elements, means connecting the driven element of one of said slipping couplings directly to a second element of said gear group, means connecting the driven element of the other of said slipping couplings to a third member of said gear group, means to impose substantially the full torque present in the input shaft upon one of said slipping couplings to establish a certain speed ratio for driving said output shaft, means to divide the torque in a substantially fixed ratio between said slipping couplings to establish a faster speed ratio for driving said output shaft, and means to decrease the torque value imposed upon both of said slipping couplings to a fixed portion of the input torque value incidental to establishment of a still faster speed ratio for driving said output shaft.

8. In a transmission, a driving member, a driven member, means forming a sequence of at least three speed ratios adapted for connecting said members, a slipping coupling adapted to participate in the drive to the driven member in all of said speed ratios and to transmit at least a major portion of the torque present in the driving member in at least one of said speed ratios and an appreciable portion of the torque in all speed ratios, means including a clutch adapted when engaged to reduce the torque required to be transmitted by the slipping coupling and to establish a speed ratio higher than the lowest available in the transmission, and means including another clutch adapted when accumulatively engaged to reduce still further the torque required to be transmitted by the slipping coupling and to reduce the torque required to be transmitted by the first said clutch and to establish a still higher speed ratio.

9. In an automobile transmission, an engine driven hollow housing at the forward end thereof, a slipping coupling within said housing, an output shaft at the rearward end of said transmission, a plurality of gear units positioned between the slipping coupling and the output shaft and adapted to give a direct drive, a low rate torque multiplying gear ratio and at least one higher rate torque multiplying gear ratio, the drive through all of the ratios requiring torque transmission by said slipping coupling, said slipping coupling having slip resisting characteristics sufficent to enable said coupling to transmit substantially the entire engine torque in the said higher torque multiplying gear ratio, but insufficient to transmit properly all of the torque in the lower rate torque multiplying gear ratio or in direct drive, means connecting said coupling so that said coupling transmits substantially the entire engine torque in the higher torque multiplying ratio, and means in said transmission to reduce the torque load imposed upon the slipping coupling in the low rate torque multiplying ratio and to reduce still further the torque load imposed upon the slipping coupling in direct drive, so that the slipping coupling will not be overloaded in the latter speed ranges.

10. In a transmission, a driving member, a driven member, means forming a sequence of at least three driving speed ratios adapted for connecting said members, a slipping coupling adapted to participate in the drive to the driven member to an appreciable extent in all speed ratios and to transmit a major portion of the torque present in the driving member in at least one of said speed ratios, and means adapted successively to reduce the torque value required to be transmitted by said slipping coupling to a lower value as each successively higher speed ratio is attained between the driving and driven members.

11. A multiple speed transmission comprising a driving member adapted for connection to an engine, a driven member, a plurality of planetary gear units adapted to be connected between the driving member and the driven member to give under differing conditions at least a direct drive through the transmission, a low rate torque multiplying ratio, and a high rate torque multiplying ratio, a shock absorbing slipping coupling subject to excessive slipping characteristics when overloaded participating in the drive through said transmission in all of said speed ratios, and means in said transmission to divide the power-flow therethrough in certain of the ratios so that the slipping coupling will be required to transmit at least the major portion of the engine torque in the high rate torque multiplying ratio, a less proportion of the engine torque in the low rate torque multiplying ratio, and a still less proportion of the engine torque in direct drive.

12. In a power transmission, a plurality of planetary gear units, an element of each of a given plurality of said planetary gear units adapted to function as a reactance member only under certain conditions, separate one-way stop means for each of said given plurality of planetary gear units adapted to restrain the reactance member associated therewith, and means for selectively establishing either the reactance member of one, or the reactance member of another of said planetary gear units in positive restraint against rotating in either direction, said means including a stationary member, a single shiftable jaw clutch member adapted when in one position to connect the reactance member of one of said planetary gear units with said stationary member, and when in another position to connect the reactance member of the other of said planetary gear units with said stationary member.

13. In a power transmission, in combination, a pair of epicyclic gear trains, each of said trains comprising an independently rotatably mounted sun gear, an internal gear and an output planet carrier having a planet pinion meshed with said sun and internal gears, movable means adapted when in one position to prevent either of said internal gears from rotating backwardly under the influence of forward rotative efforts being applied to the sun of the respective epicyclic train and for concurrently connecting the output planet carrier of one of said epicyclic trains with said driven shaft, said movable means adapted when in another position to prevent the last said planet carrier from rotating in either direction and concurrently to establish the internal gear of the last said epicyclic train rotatable with the driven shaft.

14. In a power transmission, the combination; of a driving member; a plurality of differential gear sets each having an independently rotatably mounted sun driving gear element, an independently rotatably mounted internal second driving gear element and an output planet carrier having a planet pinion meshed with the sun and internal gears of the respective differential gear set, clutching means for individually connecting the sun and internal gears of the first of said differential gear sets to said driving member, separate clutching means for individually connecting the sun gear of each succeeding of said plurality of differential gear sets to said driving member, means connecting the output planet carrier of the preceding of any pair of differential gear sets of said plurality to the internal gear of the next succeeding of the differential gear sets so as to form a power flow path from said driving member to the said next succeeding gear set independently of the connection between said driving member and the sun gear of the last said differential gear set.

15. In a power transmitting mechanism, in combination, a first pair of coaxial members, a second pair of coaxial members concentric with said first pair of members, a shiftable jaw clutch member for connecting or disconnecting one of said pairs, a second jaw clutch member for connecting or disconnecting the other of said pairs, one of said clutch members being carried shiftable with, but adapted for rotation independently of the other of said clutch members.

16. In a power transmission, in combination, a first differential gear unit including a first internal gear adapted to be rotated from the power source directly, a first sun gear, a first output planet carrier having a planet pinion meshed with said internal and sun gears, a second differential gear unit including a second internal gear in drive relation with said first output planet carrier directly, a second sun gear adapted to rotate independently of said first sun and internal gears and said first planet carrier, a second output planet carrier having a planet pinion meshed with said second sun and internal gears, a driving shaft for and rotatable with said second sun gear, said sun driving shaft extending axially independently through the assembly of said first differential gear unit and the connection between the first planet carrier and said second internal gear.

17. In power-transmitting connections, in combination, a first shaft and a pair of concentric with including a separate clutch means in said separate train, said two clutch means being arranged to be driven in parallel, a planet carrier having a planet pinion meshed with said sun and internal gears, manually controlled means adapted when in one position to pre-selectively establish a brake means operative to establish reactance to said internal gear and also to establish said separate driving train operative to drive said internal gear subsequent to operation of said brake means and also to enable said driven shaft to be driven from said planet carrier, said manually controlled means adapted when in another position to render said brake means and said separate driving train to said internal gear inoperative to either establish reactance or drive to said internal gear and in the stead thereof to cause said driven shaft to be driven from and in the same direction as said internal gear and also to establish connections causing said planet carrier to enforce reversing gear functions between said sun pinion and said internal gear.

23. In a power transmission, the combination of a drive member, a driven member, automatically variable change speed transmission mechanism for changing the gear ratio between said drive and driven members from a slow speed ratio torque-multiplying gear drive to a faster speed ratio lower rate torque-multiplying gear drive including a circuit of power-transmitting connections having a first speed responsive clutching means to establish said circuit only partially drivingly closed while incidentally completing the driving connections for said slow speed ratio of drive, and friction second speed responsive clutch means parallel to and subsequently drivingly accumulatively operable in addition to said first clutching means to complete said circuit so that said second clutch will divide the power and torque to drive the load with said first clutching means while establishing said faster speed ratio lower rate torque-multiplying drive between said drive and driven shafts, and manually operable means adapted to render inoperative one of the speed responsive means so as abnormally to secure disengagement of one of the clutch means, so as optionally to secure abnormal opening of said circuit.

24. In transmission mechanism, in combination, a drive shaft, a pair of front and rear positioned driving and driven related first and second planetary gear units, each having a sun gear, an internal gear, and an output planet carrier having a planet pinion meshed with said sun and internal gears of the respective planetary gear unit, said drive shaft being drive related directly with the internal gear of said front gear unit, the sun gear of said rear gear unit having a separate driving shaft rotatable therewith and extending axially through the position of and independently of the entire assembly of said front gear unit including the latter's planet carrier, so that said sun gear driving shaft is adapted to take delivery of driving rotative efforts at a point relatively forward of said front gear unit, and means connecting the planet carrier of said front gear unit directly with the internal gear of said rear gear unit independently of said sun gear driving shaft.

25. In transmission mechanism, in combination, a drive shaft, a pair of relatively front and rear positioned driving and driven related first and second planetary gear units, said front gear unit being drive related directly with said drive shaft, said rear gear unit having a sun pinion, a separate sun pinion driving shaft extending axially through the position of and independently of the entire assembly of said front gear unit including the latter's planet carrier, an internal second driving gear element and an output planet carrier having a pinion meshed with the sun and internal gears and adapted to drive the load to be driven, the internal gear of said rear gear unit being drive related with the front gear unit directly and independently of the sun pinion driving shaft of said rear gear unit, speed responsive slipping clutch means having a driven element directly connected to and rotatable with the sun pinion shaft of said rear gear unit for completing the driving connections between said drive shaft and said sun pinion shaft, friction second clutch means arranged parallel to said first clutch means for supplementing said first clutch means for driving said rear gear unit, said second clutch means being adapted to establish a drive for rotating the internal gear of said rear gear unit to reduce to a split apportionment the input power and torque required to flow through the train comprised of said first clutch means and the sun pinion driving shaft of said rear gear unit, and means automatically to condition said front gear unit to give a torque-multiplying gear drive to at least one of the elements of said rear gear unit upon initial engagement of said second clutch means.

26. In transmission mechanism, in combination, a pair of front and rear positioned respectively driving and driven related planetary gear units, said front unit having an internal gear, a sun gear, a planet pinion meshed with said sun and internal gears, and a generally tubular member carrying said planet pinion, said rear gear unit having a sun pinion driving shaft extending through the position and independently of the assembly of said front gear unit and said tubular member, an internal gear in drive relation with said tubular member directly and independently of said sun pinion shaft, and an output planet carrier having a planet pinion meshed with said sun pinion and internal gear of said rear gear unit, means including slip type clutch means operable to complete a connection between said tubular member and the sun pinion shaft at a position forwardly of said front gear unit, and a driving shaft in direct drive connection with the internal gear of said front gear unit for inputting power to said unit in circumvention of said connection between said tubular member and the sun pinion shaft.

27. In transmission mechanism, in combination, a drive shaft, a pair of front and rear positioned respectively driving and driven related planetary gear units, said front gear unit including an internal gear element drive related directly with said drive shaft and a planet pinion element meshed with said internal gear, said rear gear unit having a sun pinion and a sun pinion shaft connected to said sun and extending through the position of and independently of the entire assembly of said front gear unit, an internal gear element and an output planet carrier having a planet pinion meshed with said sun pinion and internal gears of said rear gear unit, engageable and disengageable brake reaction means cooperating with said internal gear of said rear gear unit, a generally tubular-shaft operatively connected with the internal gear of said front gear unit through the front planet pinion element, said tubular shaft concentrically encompassing an intermediate portion of the sun pinion driving shaft of said rear gear unit, clutch slipping coupling so as to provide a pair of parallel driving connections to said second unit whereby the input power and torque required to drive the third element of said second unit and therefrom the load to be driven will be divided between said slipping coupling and said clutch means.

33. In a transmission device, a pair of front and rear positioned respectively driving and driven planetary gear units each comprised of a sun gear, an internal gear, and an output planet carrier having a planet pinion meshed with said sun and internal gears of the respective unit, the sun gear of said rear unit adapted to be normally rotatable independently of the entire assembly of said front unit including the latter's planet carrier, connections to drive said rear unit including said front unit and a slip-type clutch means operable upon sufficient speed of driving rotation being imparted thereto, said clutch means being connected on its driving side with said front unit, the driven element of said clutch being fixed to rotate with the sun gear of said rear unit, said clutch forming means permitting the driving connections between the power source and the sun gear of said rear unit to be permanently mobilized but no-drive until operation of said clutch means, and the internal gear of said rear unit having a driving connection with the output planet carrier of said front unit independently of the driving train including said clutch means and the connection between the sun of said rear unit and the clutch means.

34. In a transmission device, a pair of relatively front and rear positioned respectively driving and driven planetary gear units each comprised of a sun gear element, an internal gear element, and an output planet carrier having a planet pinion meshed with the sun and internal gears of the respective unit, connections adapted to drive said rear unit, said connections including said front unit and a speed responsive slip-type clutch means connected on its driving side with said front unit and having its driven clutch element fixed rotatable with the sun pinion of said rear unit, and a second clutch means normally automatically operable subsequent to the operation of said first clutch means, said second clutch means being arranged parallel to said first clutch means, said second clutch means adapted automatically to establish the drive to rotate the internal gear element of said rear unit accumulatively and in circumvention and independently of said first clutch means by way of the front unit via its output planet carrier, whereby said second clutch means when engaged assumes only a portion of the load imposed upon the rear planet carrier, the ratio of said portion to the portion of the load assumed by the first said clutch means being the same as the ratio of the pitch line velocity of the internal gear of the rear unit to the pitch line velocity of the sun pinion of the same unit.

EVERETT R. BURTNETT.